United States Patent
Tao et al.

(10) Patent No.: US 11,239,628 B2
(45) Date of Patent: Feb. 1, 2022

(54) METHOD FOR REALIZING PRECISE TARGET GAIN CONTROL FOR HYBRID FIBRE AMPLIFIER, AND HYBRID FIBRE AMPLIFIER

(71) Applicant: Accelink Technologies Co., Ltd., Wuhan (CN)

(72) Inventors: Jintao Tao, Wuhan (CN); Chengpeng Fu, Wuhan (CN); Cuihong Zhang, Wuhan (CN); Fei Cai, Wuhan (CN); Tao Xiong, Wuhan (CN); Yunyu Jing, Wuhan (CN); Qinlian Bu, Wuhan (CN); Chunping Yu, Wuhan (CN)

(73) Assignee: Accelink Technologies Co., Ltd.

( * ) Notice: Subject to any disclaimer, the term of this patent is extended or adjusted under 35 U.S.C. 154(b) by 644 days.

(21) Appl. No.: 16/089,929

(22) PCT Filed: Dec. 19, 2016

(86) PCT No.: PCT/CN2016/110660
§ 371 (c)(1),
(2) Date: Sep. 28, 2018

(87) PCT Pub. No.: WO2017/166869
PCT Pub. Date: Oct. 5, 2017

(65) Prior Publication Data
US 2019/0131758 A1 May 2, 2019

(30) Foreign Application Priority Data

Mar. 30, 2016 (CN) .......................... 201610189349.3

(51) Int. Cl.
*H04B 10/291* (2013.01)
*H04B 10/293* (2013.01)
(Continued)

(52) U.S. Cl.
CPC ...... *H01S 3/1302* (2013.01); *H01S 3/094003* (2013.01); *H01S 3/10015* (2013.01);
(Continued)

(58) Field of Classification Search
CPC ....................... H04B 10/2916; H04B 10/2931
See application file for complete search history.

(56) References Cited

U.S. PATENT DOCUMENTS

| 2004/0190123 | A1 | 9/2004 | Nakamura et al. |
| 2004/0201882 | A1* | 10/2004 | Kikuchi ............. H04B 10/2916 359/341.43 |

(Continued)

FOREIGN PATENT DOCUMENTS

| CN | 1490941 A | 4/2004 |
| CN | 102843192 A | 12/2012 |

(Continued)

OTHER PUBLICATIONS

Chinese Office Action for Application No. 2016101893493 dated Oct. 11, 2017.

(Continued)

*Primary Examiner* — Eric L Bolda
(74) *Attorney, Agent, or Firm* — Lerner, David, Littenberg, Krumholz & Mentlik, LLP

(57) ABSTRACT

A method for realizing precise gain control for a hybrid fibre amplifier, and a hybrid fibre amplifier, in which by an erbium-doped fibre amplifier firstly outputting a constant power, a comparable source signal optical power is provided for a raman fibre amplifier of a next stage. A feedback for the gain control may be formed by comparing a source signal optical power calculated after starting pumping of the Raman fibre amplifier and a source signal optical power detected after pumping stops, thereby greatly improving gain control precision of the Raman fibre amplifier. More- (Continued)

over, the erbium-doped fibre amplifier parts of all the hybrid fibre amplifiers may simultaneously output a constant optical power, and the Raman amplifier parts of all the hybrid fibre amplifiers may simultaneously start calibration, so that the time for starting operation of the entire system may be improved greatly.

3 Claims, 1 Drawing Sheet

(51) Int. Cl.
| | |
|---|---|
| H01S 3/094 | (2006.01) |
| H01S 3/067 | (2006.01) |
| H01S 3/16 | (2006.01) |
| H01S 3/30 | (2006.01) |
| H01S 3/13 | (2006.01) |
| H01S 3/23 | (2006.01) |
| H04B 10/25 | (2013.01) |
| H01S 3/10 | (2006.01) |

(52) U.S. Cl.
CPC ........ *H01S 3/13013* (2019.08); *H01S 3/2375* (2013.01); *H04B 10/25891* (2020.05); *H04B 10/293* (2013.01); *H04B 10/2916* (2013.01); *H04B 10/2931* (2013.01); *H01S 3/06758* (2013.01); *H01S 3/1608* (2013.01); *H01S 3/302* (2013.01); *H01S 2301/02* (2013.01); *H01S 2301/04* (2013.01)

(56) References Cited

U.S. PATENT DOCUMENTS

| | | | |
|---|---|---|---|
| 2009/0091819 A1* | 4/2009 | Bolshtyansky | H01S 3/1301 359/334 |
| 2011/0255151 A1 | 10/2011 | Magri et al. | |
| 2014/0253998 A1* | 9/2014 | Otani | H01S 3/13013 359/341.41 |
| 2015/0085350 A1* | 3/2015 | Griseri | H04B 10/2916 359/334 |
| 2015/0214913 A1 | 7/2015 | Fu et al. | |

FOREIGN PATENT DOCUMENTS

| | | |
|---|---|---|
| CN | 103904550 A | 7/2014 |
| CN | 105871468 A | 8/2016 |

OTHER PUBLICATIONS

International Search Report for Application No. PCT/CN2016/110660 dated Mar. 16, 2017.

Liu, Xinhua et al., "EDFA- and RFA-based Gain-Variable Hybrid Fiber Amplifiers", Study on Optical Communications, No. 2, Apr. 30, 2014 (Apr. 30, 2014), 4 pages (English Abstract provided).

* cited by examiner

METHOD FOR REALIZING PRECISE TARGET GAIN CONTROL FOR HYBRID FIBRE AMPLIFIER, AND HYBRID FIBRE AMPLIFIER

CROSS-REFERENCE TO RELATED APPLICATION

This application is a national phase entry under 35 U.S.C. § 371 of International Application No. PCT/CN2016/110660, filed Dec. 19, 2016, which claims priority to Chinese Patent Application No. 201610189349.3, filed on Mar. 30, 2016, the disclosures of which are incorporated herein by reference.

TECHNICAL FIELD OF THE DISCLOSURE

The present invention relates to optical communication field, and particularly to a method for realizing precise target gain control for a hybrid fibre amplifier and a hybrid fibre amplifier.

BACKGROUND

Fibre amplifier is one of the most important components in an optical communication system. With the development of optical communication technology, especially commercial application of 100 G optical coherent communication systems, requirements for the amplifiers in the optical communication systems are raised continuously. An erbium-doped fibre amplifier (EDFA, hereinafter EDFA refers to the erbium-doped fibre amplifier) alone or a Raman fibre amplifier (RFA, hereinafter RFA refers to the Raman fibre amplifier) alone cannot meet the requirements of optical communication systems with ever-increasing transmission capacity as the former has limitations in noise index and the latter has limitations in gain, amplification efficiency. A hybrid fibre amplifier, which is formed by combining and centralizedly controlling the above two amplifiers in order to utilize their advantages and compensate for their respective defects, will be widely used in modern communication systems.

In the prior arts, the RFA and EDFA are used independently, and their gain and/or slope are adjusted separately without a centralized control platform to adjust the amplification gain and/or slope of the hybrid fibre amplifier (HYFA, hereinafter HYFA indicates a hybrid fibre amplifier). In 2012, a patent application NO. 201210325897.6 proposed a hybrid fibre amplifier and a method for adjusting gain and/or gain slope of the hybrid fibre amplifier. This patent application provides a detailed method for adjusting overall gain and overall slope. Specifically, controlling of the RFA gain is implemented by an out-of-band amplified spontaneous emission (ASE, hereinafter ASE refers to the amplified spontaneous emission). The out-of-band ASE consists of two parts, one is the ASE generated during amplifying the signal light, and the other is the ASE originally in the source signal light with amplified power. In order to precisely control gain of the RFA, the two kinds of ASE have to be controlled precisely. However, in practical applications, as the RFA and the EDFA are used in combination with each other, differences in transmission fibre types, and system environmental differences would affect relationship between gain and out-of-band ASE in a RFA control formula, and ON/OFF state and output power of the EDFA in the same system would affect magnitude of the ASE of the RFA in a next stage of the system. As a result, even if an overall out-of-band ASE power of the RFA can be detected, error of the controlled gain is still relatively large due to variations of relationship between the gain and the out-of-band ASE and the fact that the RFA itself cannot distinguish magnitude of the out-of-band ASE in the source signal light. If a feedback for the gain control of the RFA can be provided, and the RFA is controlled to provide a stable out-of-band ASE power whenever it starts pumping, the accuracy of gain control of the hybrid fibre amplifier can be greatly improved.

In addition, the EDFA disclosed in the patent application No. 201210325897.6 does not include a variable attenuator (VOA, hereinafter VOA refers to variable attenuator), which causes a slope change at the time of controlling the EDFA gain. Although the slope change may be compensated by adjusting the RFA slope, the gain can be controlled only in a limited range, which cannot meet the requirements of diverse transmission scenarios in practice. If the EDFA includes a built-in VOA in the optical path, the gain and slope adjustment range of the hybrid fibre amplifier can be greatly increased. As to the concern of the noise index of the EDFA having the built-in VOA, since the noise index of the hybrid fibre amplifier is mainly determined by the first stage amplifier, the noise index of the hybrid fibre amplifier is much smaller than that of the EDFA alone, and it can satisfy needs of most communication systems.

SUMMARY

In consideration of the above problems, an object of the present invention is to provide a hybrid fibre amplifier and a method for precisely controlling a target gain of the hybrid fibre amplifier, which aims to solve the problems of being difficult to achieve precise target gain control of the hybrid fibre amplifier in the system and relatively small range for the gain adjustment.

The present invention adopts the following technical solutions:

a method for precisely controlling a target gain of a hybrid fibre amplifier, mainly comprising the following steps:

Step 1: controlling an erbium-doped fibre amplifier in the hybrid fibre amplifier first to output light with a constant power P1 when the hybrid fibre amplifier starts pumping;

Step 2: controlling a Raman fibre amplifier in the hybrid fibre amplifier to detect power of a source signal light S1 and power of an out-of-band ASE Source_ASE1 included in the source signal light after the erbium-doped fibre amplifier outputs the constant power for a certain period of time t1;

Step 3: reading the target gain G1 and a relationship between the gain and the out-of-band ASE obtained by calibration to calculate an object ASE power G1_ASE1, and calculating an object out-of-band ASE power Object_ASE_1 compensated by the source ASE, where Object_ASE_1=G1_ASE1+Source_ASE1*G1;

Step 4: controlling the Raman fibre amplifier to start pumping when it is determined that the source signal power S1 detected by the Raman fibre amplifier is stable, and reading the detection value of the out-of-band ASE power in real-time;

Step 5: comparing the detection value of the out-of-band ASE power read in Step 4 with Objec_ASE_1 and stopping pumping power adjustment when the two values are equal to each other;

Step 6: Calculating a source signal power S2 after pumping start when the pumping power of the Raman fibre amplifier is stable, and calculating S1 with S2 to calculate delta Gain=S2−S1;

Step 7: compensating the delta Gain for the target Gain to obtain G2=G1−delta Gain, repeating Step 3 to calculate a new object out-of-band ASE power ASE3, and repeating Step 4 and Step 5;

Usually when Step 5 is completed, pumping adjustment may stop and the gain controlled by the Raman fibre amplifier is relatively accurate. If a system error is relatively large or the system requires for a relatively high accuracy, Step 3 to Step 6 may be repeated after Step 7 is completed until the delta Gain meets the accuracy requirement of the system.

Step 8: controlling the erbium-doped fibre amplifier to start pumping according to a preset gain requirement so as to achieve a rated control gain of the hybrid fibre amplifier, after the pumping power of the Raman fibre amplifier becomes stable.

The hybrid fibre amplifier includes a Raman fibre amplifier part, an erbium-doped fibre amplifier part and a control unit part. The Raman fibre amplifier part includes a pump signal combiner, a Raman pump laser bank connected to a pumping input end of the pump signal combiner, a first optical splitting coupler connected to a signal output end of the pump signal combiner, a first photodetector connected to a small end of the first optical splitting coupler, an out-of-band ASE filter connected to a large end of the first optical splitting coupler, a second photodetector connected to an out-of-band light output end of the out-of-band ASE filter, a second optical splitting coupler (7) connected to a signal light output end of the out-of-band ASE filter (5), and a third photodetector (8) connected to a small end of the second optical splitting coupler (7), a large end of the second optical splitting coupler (7) being the output of the Raman fibre amplifier part and being connected with an input end of the erbium-doped fibre amplifier parts (9); the control unit part (10) being connected with the Raman pump laser bank (11), the first photodetector (4), the second photodetector (6), the third photodetector (8), and the erbium-doped fibre amplifier (9), respectively. The erbium-doped fibre amplifier part includes a pump laser bank and a variable attenuator. The control unit part includes a pump laser output control unit, a signal light and out-of-band ASE detecting and storing unit, a gain and out-of-band ASE calculating unit, and an erbium-doped fibre amplifier control unit.

The hybrid fibre amplifier and the precise target gain control method of the present invention have the following advantages:

1. The erbium-doped fibre amplifier part in a hybrid fibre amplifier of a previous stage firstly outputs a constant power, providing a comparable source signal optical power for the Raman fibre amplifier part in a hybrid fibre amplifier of a next stage. By comparing the source signal power calculated after the Raman starts pumping and the source signal power detected when pumping stops, a feedback may be provided for the gain control, thereby greatly improving precision of gain control for the Raman fibre amplifier.

2. The erbium-doped fibre amplifier parts of all the hybrid fibre amplifiers simultaneously output a constant optical power, and the Raman amplifier parts of all the hybrid fibre amplifiers are simultaneously calibrated, so that time for starting operation of the entire system is improved greatly.

3. There is no limit on whether the erbium-doped fibre amplifier part should include a built-in variable attenuator or not, and a gain adjustment range of the hybrid fibre amplifier is increased greatly.

Figure 1:
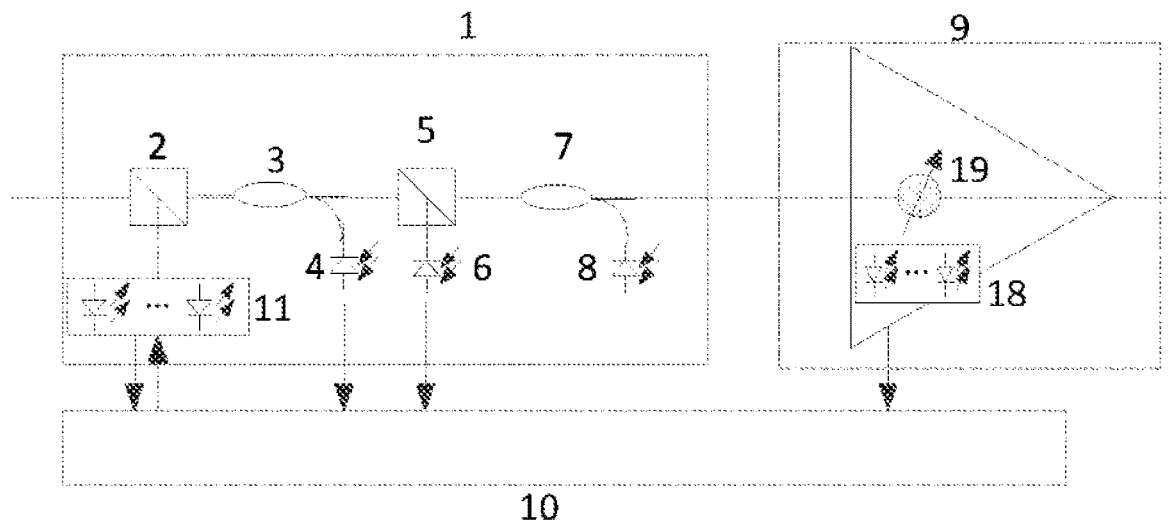
FIG. 1 illustrates a structure of a hybrid fibre amplifier of the present invention.

In the drawings:
1: Raman fibre amplifier part;
2: Pump signal combiner;
3: First optical splitting coupler;
4: First photodetector;
5: Out-of-band ASE filter;
6: Second photodetector;
7: Second optical splitting coupler;
8: Third photodetector;
9: Erbium-doped fibre amplifier part;
10: Control unit part;
11: Raman pump laser bank;
12: Erbium-doped fibre power amplifier;
13: First transmission fibre;
14: First hybrid fibre amplifier;
15: Second transmission fibre;
16: Third transmission fibre;
17: Second hybrid fibre amplifier;
18: EDFA pump laser bank;
19: Variable attenuator;
20: Pump laser bank control unit;
21: Signal light and out-of-band ASE detecting and storing unit;
22: Gain and out-of-band ASE calculating unit;
23: EDFA control unit

DETAILED DESCRIPTION

In order to make purposes, technical solutions and advantages of the present invention more clear, this invention is further explained in combination with drawings and embodiments. It should be appreciated that the specific embodiments described here are only for explaining but not limiting the invention.

The hybrid fibre amplifier provided in the present invention integrates a Raman fibre amplifier and an erbium-doped fibre amplifier, and by overall control of them, an accurate expected effect of the hybrid fibre amplifier is achieved.

Figure 2:
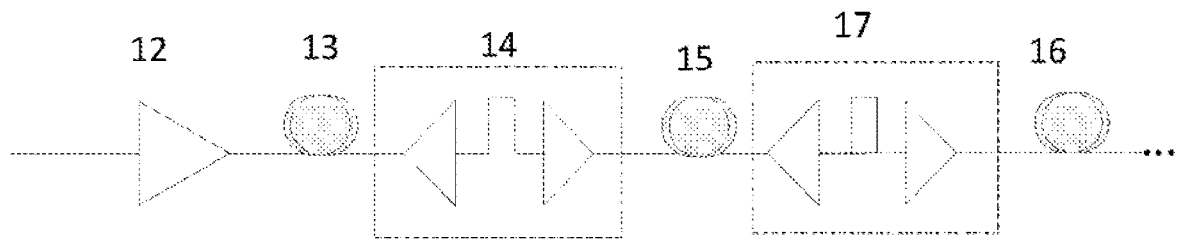
FIG. 2 is a schematic diagram illustrating configuration of hybrid fibre amplifiers used in a practical system.

FIG. 1 illustrates a hybrid fibre amplifier for realizing precise gain control according to the present invention. FIG. 2 illustrates an application scenario of the hybrid fibre amplifier of the present invention.

As shown in FIG. 1, the hybrid fibre amplifier includes a pump signal combiner (2), a pumping input end of the pump signal combiner is connected to a Raman pump laser bank (11), and a signal output end of the pump signal combiner (2) is connected to a common end of a first optical splitting coupler (3). A small end of the first optical splitting coupler (3) is connected to a first photodetector (4), and a large end of the first optical splitting coupler (3) is connected to a common end of an out-of-band ASE filter (5). An out-of-band light output end of the out-of-band ASE filter (5) is connected to a second photodetector (6), and a signal light output end of the out-of-band ASE filter (5) is connected to a common end of a second optical splitting coupler (7). A small end of the second optical splitting coupler (7) is connected to a third photodetector (8), and a large end of the second optical splitting coupler (7) serves as an output end of the Raman fibre amplifier part and is connected with the input end of the erbium-doped fibre amplifier part (9). The control unit part (10) is connected with the Raman pump laser group (11), the first photodetector (4), the second photodetector (6), the third photodetector (8), and the erbium-doped fibre amplifier parts (9), respectively.

The erbium-doped fibre amplifier part (9) includes a pump laser bank (18) and a variable attenuator (19).

As shown in FIG. 2, the depicted application scenario of the hybrid fibre amplifier includes an erbium-doped fibre power amplifier (12) and a plurality of hybrid fibre amplifiers sequentially connected, the hybrid fibre amplifiers are connected with each other by transmission fibres. The erbium-doped fibre amplifier part (9) of a previous hybrid fibre amplifier is connected with the Raman fibre amplifier part (1) of a next hybrid fibre amplifier by a transmission fibre. The erbium-doped fibre power amplifier (12) is connected to the first hybrid fibre amplifier (14) by a first transmission fibre (13), the first hybrid fibre amplifier (14) is connected to a second hybrid fibre amplifier (17) by a second transmission fibre (15), the second hybrid fibre amplifier (17) is connected to a third hybrid fibre amplifier by a third transmission fibre (16), and so on.

Figure 3:
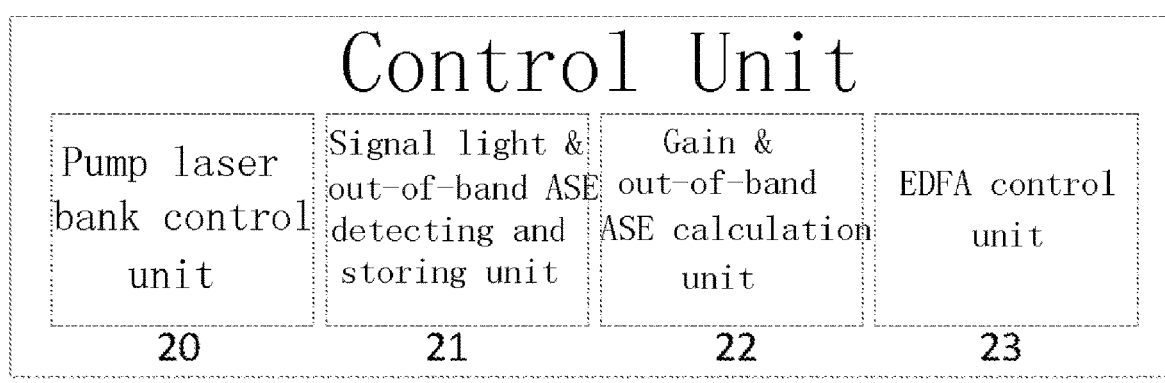
FIG. 3 is a schematic structural diagram of a control unit part.

As shown in FIG. 3, the control unit part (10) includes a pump laser output control unit (20), a signal light and out-of-band ASE detecting and storing unit (21), a gain and out-of-band ASE calculating unit (22), and an erbium-doped fibre amplifier gain control unit (23).

The present invention provides a method for precisely controlling a target gain of the hybrid fibre amplifier comprising the following steps:

Step 1: The control unit controls the EDFA part to output a constant output power, e.g. 6 dBm, when receiving a pumping start command; the output light is transmitted to the Raman fibre amplifier of the next stage through a transmission fibre, and at the same time, the Raman fibre amplifier in the present stage receives a constant optical power from the EDFA part in a hybrid fibre amplifier of a previous stage.

Step 2: The first photodector of the Raman fibre amplifier detects a source signal optical power S1 and an out-of-band ASE power Source_ASE1 contained in the source signal light when the Raman stops pumping after a period of time t1.

Step 3: A target gain G1 and a relationship between the gain and the out-of-band ASE are read to calculate a object ASE power G1_ASE1 and to calculate an object out-of-band ASE power Object_ASE_1 compensated by the source ASE, i.e., Object_ASE_1=G1_ASE1+Source_ASE1*G1.

Step 4: When it is determined that the source signal optical power S1 detected by the Raman fibre amplifier becomes stable, the Raman fibre amplifier is controlled to start pumping, and a detection value of the out-of-band ASE power is read in real-time.

Step 5: The detection value of the out-of-band ASE power read in Step 4 is compared with the Object_ASE_1, and when the two values are equal to each other, adjustment of pumping power stops.

Step 6: When the pumping power of the Raman fibre amplifier becomes stable, the source signal optical power after starting pumping is calculated as S2 and compared with S1 to calculate a delta Gain, i.e., ΔG=S2−S1.

Step 7: The target Gain G1 is compensated with the delta Gain to obtain G2, i.e., G2=G1−ΔG. Step 3 may be repeated to calculate a new object out-of-band ASE power ASE3. Then, Step 4 and Step 5 may be repeated.

Usually when Step 5 is completed, pumping adjustment may stop and the gain controlled by the Raman fibre amplifier is relatively accurate. If a system error is relatively large or the system requires for a relatively high accuracy, Step 3 to Step 6 may be repeated after Step 7 is completed until the delta Gain meets the accuracy requirement of the system.

Step 8: When the power of the Raman fibre amplifier becomes stable, the erbium-doped fibre amplifier is controlled to start pumping according to a preset gain requirement so as to achieve a rated control gain of the hybrid fibre amplifier.

What is claimed is:

1. A method for realizing precise target gain control of a hybrid fibre amplifier, being characterized in comprising the following steps:

Step 1: controlling an erbium-doped fibre amplifier of the hybrid fibre amplifier firstly to output light with a constant power P1 when the hybrid fibre amplifier starts pumping;

Step 2: after the erbium-doped fibre amplifier outputs the constant power for a period of time t1, controlling a Raman fibre amplifier of the hybrid fibre amplifier to detect a source signal optical power S1 and an out-of-band ASE power Source_ASE1 contained in the source signal light;

Step 3: reading a target gain G1 from a control unit part and a relationship between the gain and the out-of-band ASE obtained by calibration to calculate a target ASE power $P_{G1}$_ASE1, and calculating a target out-of-band ASE power Target_ASE_1 compensated by the source ASE: Target_ASE_1=$P_{G1}$_ASE1+Source_ASE1*G1;

Step 4: controlling the Raman fibre amplifier to start pumping when it is determined that the source signal optical power S1 detected by the Raman fibre amplifier becomes stable, and reading a detection value of the out-of-band ASE power in real-time;

Step 5: comparing the detection value of the out-of-band ASE power read in Step 4 with the Target_ASE_1, and stopping adjustment of the pumping power when the two values are equal to each other;

Step 6: when the pumping power of the Raman fibre amplifier becomes stable, calculating a source signal optical power S2 after starting pumping, and comparing S1 with S2 to calculate a delta Gain ΔG=S2−S1; if the delta Gain meets an accuracy requirement, proceeding to Step 8 directly; and if the delta Gain does not meet the accuracy requirement, proceeding to Step 7;

Step 7: compensating the delta Gain to the target gain to obtain G2=G1−ΔG; repeating Step 3 to calculate a new target out-of-band ASE power ASE3; and repeating Step 4, Step 5 and Step 6 in this order;

Step 8: controlling the erbium-doped fibre amplifier to start pumping according to a preset gain requirement so as to achieve a rated control gain of the hybrid fibre amplifier when the pumping power of the Raman fibre amplifier becomes stable.

2. A hybrid fibre amplifier for realizing a precise target gain control, being characterized in comprising a Raman fibre amplifier part (1), an erbium-doped fibre amplifier part (9), and a control unit part (10); the Raman fibre amplifier part including a pump signal combiner (2), a Raman pump laser bank (11) connected to a pumping input end of the pump signal combiner (2), a first optical splitting coupler (3) connected to a signal output end of the pump signal combiner (2), a first photodetector (4) connected to a low transmission end of the first optical splitting coupler (3), an out-of-band ASE filter (5) connected to a high transmission end of the first optical coupler (3), a second photodetector (6) connected to an out-of-band light output end of the out-of-band ASE filter (5), a second optical splitting coupler (7) connected to a signal light output end of the out-of-band ASE filter (5), a third photodetector (8) connected to a low transmission end of the second optical splitting coupler (7), a high transmission end of the second optical splitting coupler (7) serving as an output end of the Raman fibre amplifier part, and the output end of the Raman fibre amplifier part being connected with an input end of the erbium-doped fibre amplifier part (9); wherein the low transmission end for the first coupler and the second coupler is tap output with low transmission, and the high transmission end for the first coupler and the second coupler is tap output with high transmission as compared to the low transmission end;

the control unit part (10) being connected with the Raman pump laser bank (11), the first photodetector (4), the second photodetector (6), the third photodetector (8), and the erbium-doped fibre amplifier part (9), respectively, wherein the first photodetector of the Raman fibre amplifier is used for detecting a source signal optical power S1 and an out-of-band ASE power Source ASE1 contained in the source signal light when the Raman stops pumping.

3. The hybrid fibre amplifier for realizing a precise target gain control according to claim 2, being characterized in that:

the control unit part (10) includes a pump laser output control unit (20), a signal light and out-of-band ASE detecting and storing unit (21), a gain and out-of-band ASE calculating unit (22), and an erbium-doped fibre amplifier gain control unit (23).

\* \* \* \* \*